Feb. 4, 1930.    W. GENSECKE    1,746,078
APPARATUS FOR PURIFYING OILS AND FATS IN
VACUO BY MEANS OF STEAM OR THE LIKE
Filed Aug. 26, 1924
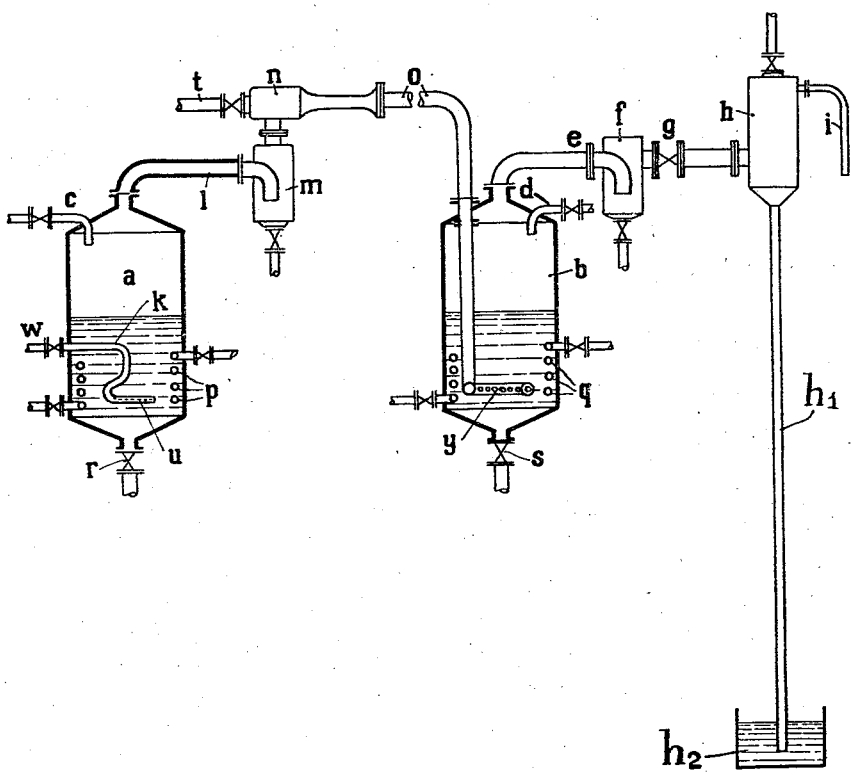
Wilhelm Gensecke
Inventor:

Patented Feb. 4, 1930

1,746,078

UNITED STATES PATENT OFFICE

WILHELM GENSECKE, OF BAD HOMBURG, GERMANY

APPARATUS FOR PURIFYING OILS AND FATS IN VACUO BY MEANS OF STEAM OR THE LIKE

Application filed August 26, 1924, Serial No. 734,319, and in Germany September 18, 1923.

This invention relates to a process of purifying oils and fats in vacuo by means of steam or the like.

It is generally known that odoriferous constituents and other volatile impurities contained in oils and fats can be removed by a current of steam or the like, the more rapidly and thoroughly, the higher the vacuum present during this treatment.

It is moreover known that the greater part of these substances can be driven off by means of the aforesaid treatment within a very short time, whilst the removal of the remainder takes a relatively considerable time, and consequently requires a large amount of steam.

In order better to utilize the extracting steam and to render the process more economical attempts have subsequently been made to arrange two or more vacuum extraction vessels in series, and to pass the same extracting steam through the oil or fat contained in these extraction vessels. A great disadvantage inherent in this method is that owing to the series arrangement, the vacuum is somewhat lower in those extraction vessels into which the extracting steam first enters, than in the subsequent extraction vessels and that the removal of the volatile substance from the oil or fat consequently takes a longer time and is also effected less thoroughly in the first extraction vessel than for example in the subsequent extraction vessel where the oils or fats are under a higher vacuum.

The present invention aims at completely overcoming this disadvantage and thus attaining a great economical progress.

According to the invention a steam injector or like pressure device is interposed between the vacuum extraction vessel which the extracting steam first enters and one or more other extraction vessels arranged in series therewith. The extracting steam passing through the oil and fat contained in the first extraction vessel is aspirated by the injector. In this way it is easily possible to produce in this first extraction vessel an equal or even a higher vacuum than in the second extraction vessel of the series wherein the vacuum is produced by a condensing plant of usual type such as surface condensers, barometric condensers or the like.

After passing through the contents of the first extraction vessel the extracting steam mixes with the operating steam of the injector and the steam mixture thus produced passes through the oil or fat contained in the second extraction vessel. By this mode of operation the steam required for operating the injector is utilized for the removal of the volatile impurities of the second extraction vessel.

It is understood that the extraction vessels $a$ and $b$ may have a different construction or that the steam may be applied in a different way.

In order more clearly to understand the invention, reference is made to the accompanying drawing which shows by way of example one embodiment of an apparatus for carrying out the process.

In said drawing $a$ and $b$ are two vacuum vessels in which the purification process takes place. The oil to be treated is introduced through inlet conduits $c$ and $d$. The vacuum vessel $b$ is in communication with a receiver $f$ through a conduit $e$, and said receiver is in communication through a valve $g$ with a condenser $h$ which is illustrated by way of example as an injection condenser with a barometric tube and a vent conduit $i$, a partial vacuum being maintained by means of a tube $h'$ dipping at its bottom in a tray $h^2$, as is well understood. The vessel $a$ is also in communication with a receiver $m$ through a conduit $l$. The receiver $m$ is in communication with a steam injector $n$, the operating steam for which is taken from a live steam conduit $t$ whilst the exhaust steam is led into the vacuum vessel $b$ through the conduit $o$. A steam conduit $k$ enters the vessel $a$ terminating in a perforated spiral tube $u$ at the lower part of the vessel. The corresponding steam conduit $o$ of the vessel $b$ also terminates in a perforated spiral tube $y$. Moreover the vessels $a$ and $b$ are provided with heating coils $p$ and $q$ respectively which if desired may also serve as cooling coils. Controllable outlet $r$ and $s$ are provided for the removal of the treated oil from the vacuum vessels.

The operation of the apparatus is effected in the following manner: After the vessels $a$ and $b$ have ben filled to the desired level with the oil to be treated, the valve $g$ is opened so that the whole apparatus is placed under vacuum by the action of the condenser. The injector $n$ is thereupon started, the exhaust steam passing via the perforated spiral tube $y$ through the oil in the vessel $b$. At the same time steam is introduced into the vessel $a$ by opening the valve $w$. This steam together with the removed odoriferous constituents is forced by means of the injector $n$ into the vessel $b$.

By suitably dimensioning the injecting apparatus $n$ relatively to the vacuum-producing system of the condenser $h$, the two vessels $a$ and $b$ may be maintained under definite pressures relative to each other. Thus the vacuum in $a$ may be maintained the same or higher than that in vessel $b$.

The receivers $m$ and $f$ are provided to permit particles carried in suspension by the gas and vapor current coming from the extraction chambers to settle out by gravity.

On the other hand it is not necessary for the number of the purification vessels to be restricted to two. On the contrary one or more further vessels can be arranged in series with the vessel $b$, the action of the injector-compressor being utilized in the above-described manner.

What I claim is:

1. Apparatus for purifying oils and fats, comprising two treating vessels, means for subjecting material in the first of said treating vessels to the action of steam, means for vacuumizing the second treating vessel, means connecting the two treating vessels, and means located in said connecting means for inducing flow of gaseous products from the first to the second of said treating vessels and operative to maintain in the first vessel a vacuum in excess of the vacuum held in the second vessel.

2. Apparatus for purifying oils and fats, comprising two treating vessels, means for subjecting material in the first of said treating vessels to the action of steam, a receiver connected to the second of said treating vessels, means for vacuumizing the second treating vessel and said receiver, means connecting the two treating vessels, and means located in said connecting means for inducing flow of gaseous products from the first to the second of said treating vessels and operative to maintain in the first vessel a vacuum in excess of the vacuum held in the second vessel and receiver.

3. Apparatus according to claim 1, wherein the flow inducing means between the first and the second heating vessel is a steam injector.

In testimony whereof I affix my signature.

WILHELM GENSECKE.